US008122926B2

(12) United States Patent
Rogers

(10) Patent No.: US 8,122,926 B2
(45) Date of Patent: Feb. 28, 2012

(54) APPARATUS AND SYSTEMS FOR INTEGRATION OF A CENTRAL TIRE INFLATION SYSTEM MANIFOLD INTO A WHEEL

(75) Inventor: Larry K. Rogers, Bordentown, NJ (US)

(73) Assignee: Hutchinson, S.A., Paris (FR)

( * ) Notice: Subject to any disclaimer, the term of this patent is extended or adjusted under 35 U.S.C. 154(b) by 86 days.

(21) Appl. No.: 12/317,779

(22) Filed: Dec. 29, 2008

(65) Prior Publication Data
US 2010/0163148 A1 Jul. 1, 2010

(51) Int. Cl.
B60C 29/00 (2006.01)
(52) U.S. Cl. .......... 152/427; 152/416
(58) Field of Classification Search .......... 152/415–416, 152/427
See application file for complete search history.

(56) References Cited

U.S. PATENT DOCUMENTS

| 2,634,784 | A  | * | 4/1953  | Fitch           | 152/417   |
|-----------|----|---|---------|-----------------|-----------|
| 2,969,824 | A  | * | 1/1961  | Howard          | 152/340.1 |
| 5,221,381 | A  | * | 6/1993  | Hurrell, II     | 152/416   |
| 6,474,383 | B1 | * | 11/2002 | Howald et al.   | 152/418   |
| 7,168,468 | B2 | * | 1/2007  | Wang et al.     | 152/427   |
| 7,686,051 | B2 | * | 3/2010  | Medley et al.   | 152/428   |
| 2008/0149243 | A1 | * | 6/2008 | Resare et al.   | 152/415   |

* cited by examiner

Primary Examiner — Jason Bellinger
(74) Attorney, Agent, or Firm — Reed Smith LLP

(57) ABSTRACT

This CTI Valve manifold of this invention creates a wheel-manifold-CTI Valve combination such that an air passageway coming from the wheel hub through the manifold brings air to the valve, and an airway from the valve through the manifold provides air to the tire cavity, preferably via an air passageway in the wheel. The manifold also allows for the CTI valve to deflate the tire, a typical operational requirement for central tire inflation systems.

20 Claims, 7 Drawing Sheets

APPARATUS AND SYSTEMS FOR INTEGRATION OF A CENTRAL TIRE INFLATION SYSTEM MANIFOLD INTO A WHEEL

BACKGROUND AND SUMMARY

The purpose of this invention is to create a means by which various central tire inflation valve configurations can be connected to a common wheel. FIG. 1 provides an example of a two-piece wheel assembly 1 with a central tire inflation (CTI) valve 2 connected to the wheel 3 in accordance with the teachings of prior art. The two-piece wheel assembly 1 includes a wheel 3 with tire 4 and CTI valve 2. Parts of the wheel 3 include a rim portion 5, disc portion 6, rim flat area 7, hub bore area 8, and CTI airways (both hub side 9 and tire side 10). The tire 4 and rim portion 5 form a tire chamber 11 that contains a pressurized fluid (usually air). Two piece wheels are usually used when a beadlock or run flat device (not shown) are utilized in the two piece wheel assembly. Two-piece wheels include two major parts, the outer rim half 12 and the inner rim half 13. The two rim halves are sealed with an o-ring 14 to prevent air from escaping out of the tire chamber 11. Studs 15 and nuts 16 secure the two rim halves 12 and 13 together.

Current CTI valve technology may, however, employ any one of several configurations. First, the CTI valve can be fixed on the face of the wheel such that an airway from the hub provides air through a channel in the wheel to the valve. The valve then channels the air into a separate airway in the wheel that leads to the tire chamber and inflates the tire. (See, e.g., FIG. 1). U.S. Pat. No. 6,076,578 describes this methodology in detail. Second, FIG. 2 shows a section of a two-piece wheel assembly 1 configured for an externally mounted CTI valve 17 and a quick release valve 18, both of which are mounted on the two-piece wheel 3. The CTI valve 17 and quick release valve 18 are located on the disc 6 of the wheel 3 with a hose 19 coming from the hub and providing air to the valve 17 and quick release 18. The valve 17 and quick release 18 then channels the air to a second hose 20 that interfaces with a fitting 21 on the wheel. The air then passes through the fitting 21 to the tire chamber 11. Third, the CTI valve can be located on the hub of the axle (typically placed at the axis of rotation). Air passes through the hub into the valve. The valve then channels the air into a hose that interfaces with a fitting on the wheel. The air then passes through the fitting to the tire chamber.

However, all of the aforesaid methods and apparatus have disadvantages. For example, with external CTI valve mounting configurations, the disadvantages include: (a) complex assembly requiring a multiplicity of components to function; (b) risk of air leakage due to high number of components; (c) increased cost due to high number of components; (d) increased risk of damage due to valve, hoses, and/or other items protruding from the face of the wheel when the vehicle is in operation; and (e) the excessive time required to assemble and disassemble the high numbers of components inherent in these designs. Likewise, for current internal CTI valve configurations, the disadvantages include: (a) the fact that, because the valve is fixed directly to the wheel, the wheel must be manufactured to specifically accommodate a particular valve or vice versa; (b) increased cost due to the need to provide multiple wheel configurations as required to accommodate various CTI valves; and (c) increased lead time to develop wheels and/or valves to accommodate an existing valve/wheel interface configuration.

BRIEF DESCRIPTION OF THE INVENTION

Thus, as previously noted, the purpose of this invention is to avoid the disadvantages of prior art by integrating a CTI Valve manifold into a wheel. In my invention, a wheel/manifold combination is provided such that an air passageway coming from the wheel through the manifold brings air to the valve, and an airway from the valve through the manifold provides air to the tire cavity via a passageway in the wheel. The manifold also allows for the CTI valve to deflate the tire, a typical operational requirement for central tire inflation systems.

The CTI manifold taught herein allows numerous advantages to be realized. First, the manifold is a method of allowing multiple CTI valve interfaces to work with a single wheel interface. A different manifold configuration can be employed for different CTI valves. Second, by having one common interface on the wheel, the wheel does not need to be redesigned and re-qualified to utilize different CTI valves. Third, by having one common interface on the wheel, retrofit in the field is possible as one type of CTI valve can easily be switched out with another, possibly without even taking the wheel off the vehicle. Fourth, and finally, as a reduced variety of wheels needs to be carried in inventory, cost can be reduced.

DESCRIPTION

Figure 1:
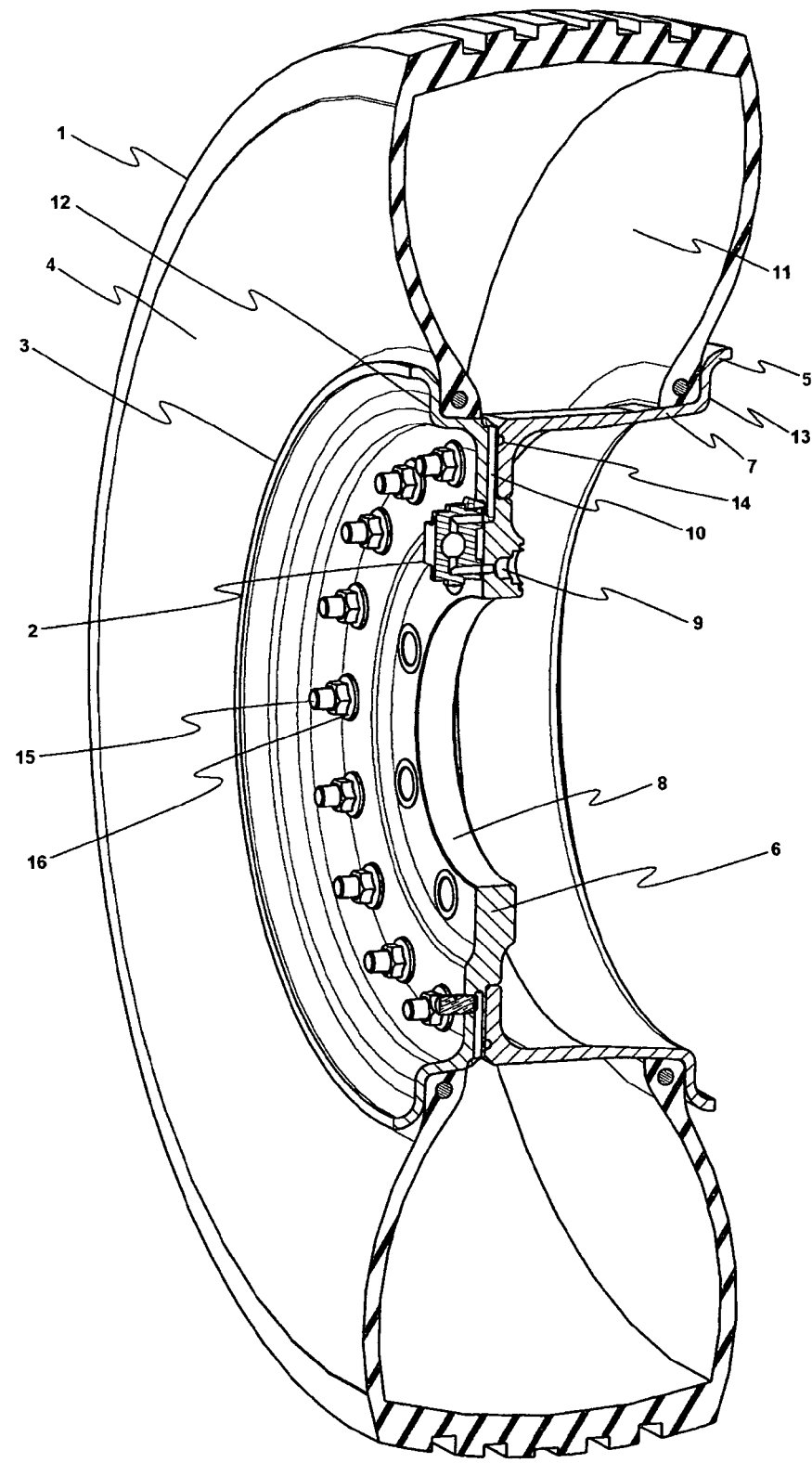
FIG. 1 provides a perspective view of a section of a two-piece wheel assembly with a central tire inflation (CTI) valve connected to the wheel in accordance with the teachings of prior art.
Figure 2:
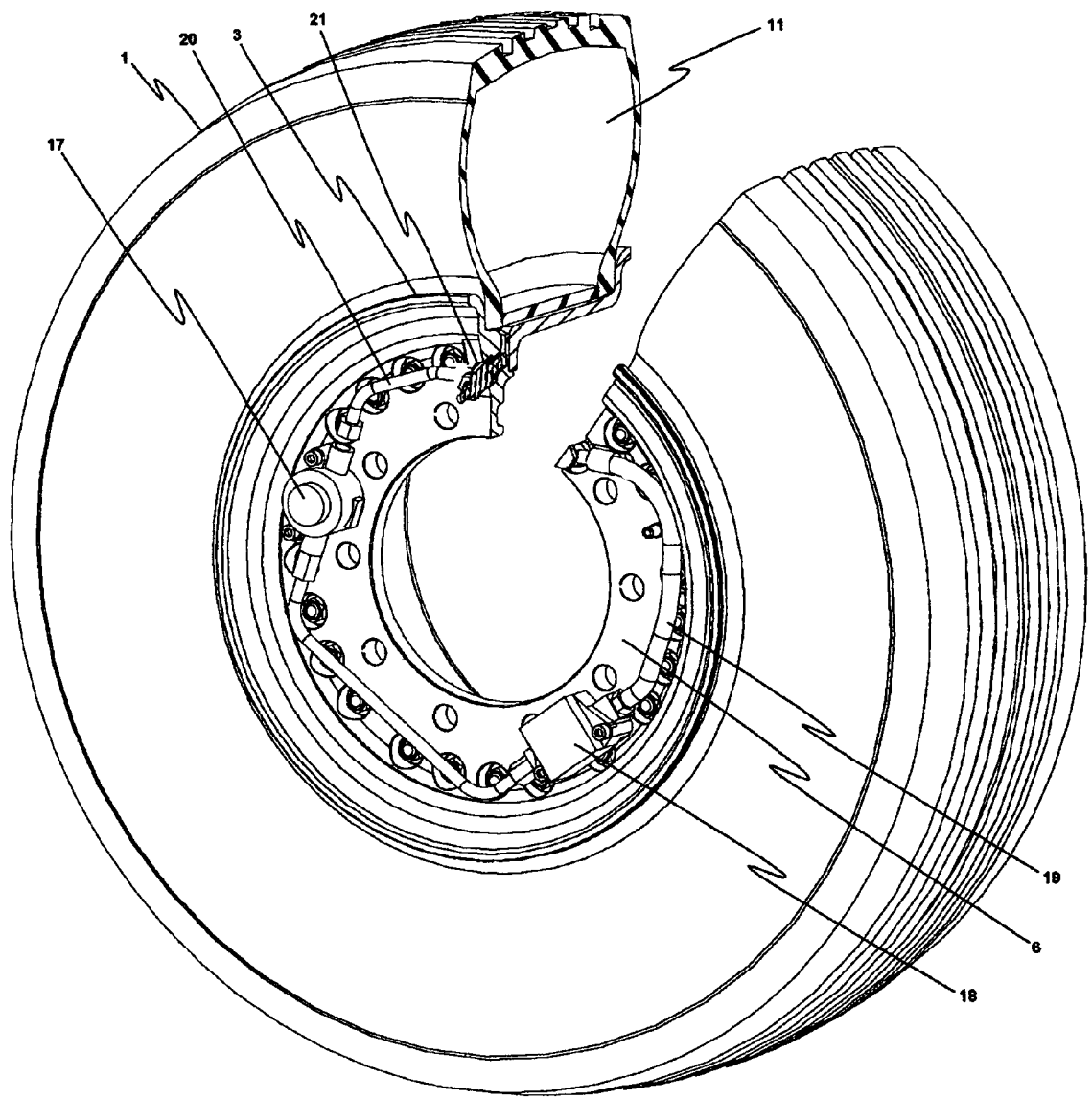
FIG. 2 provides a perspective view of a section of a two-piece wheel configured for an externally mounted CTI valve and a quick release valve, both of which are mounted on the two-piece wheel in accordance with the teachings of prior art.
Figure 3:
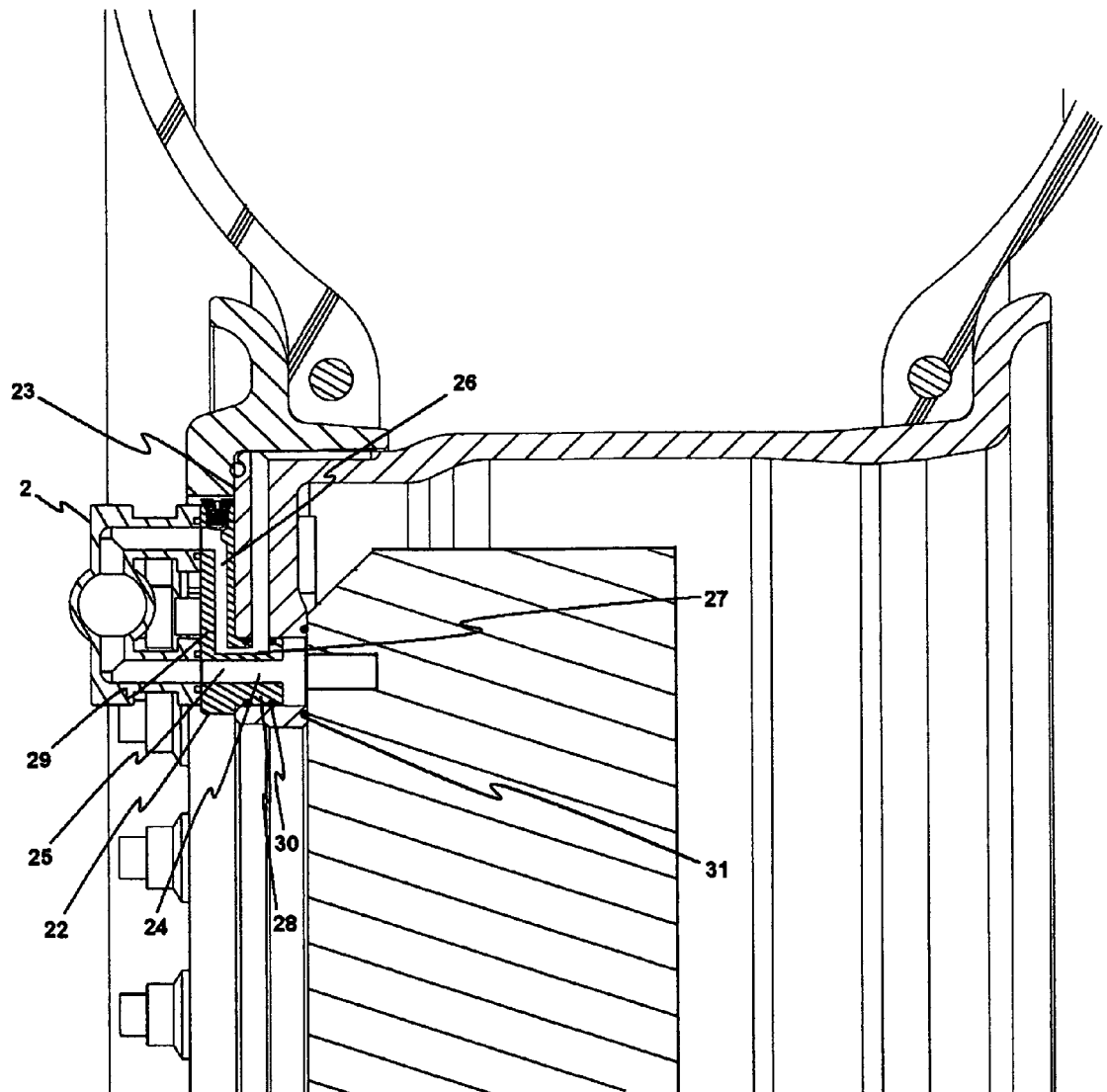
FIG. 3 provides a cross-sectional view of a portion of a two-piece wheel showing a first exemplary preferred configuration for a manifold and a manifold, wheel, CTI Valve combination.
Figure 4:
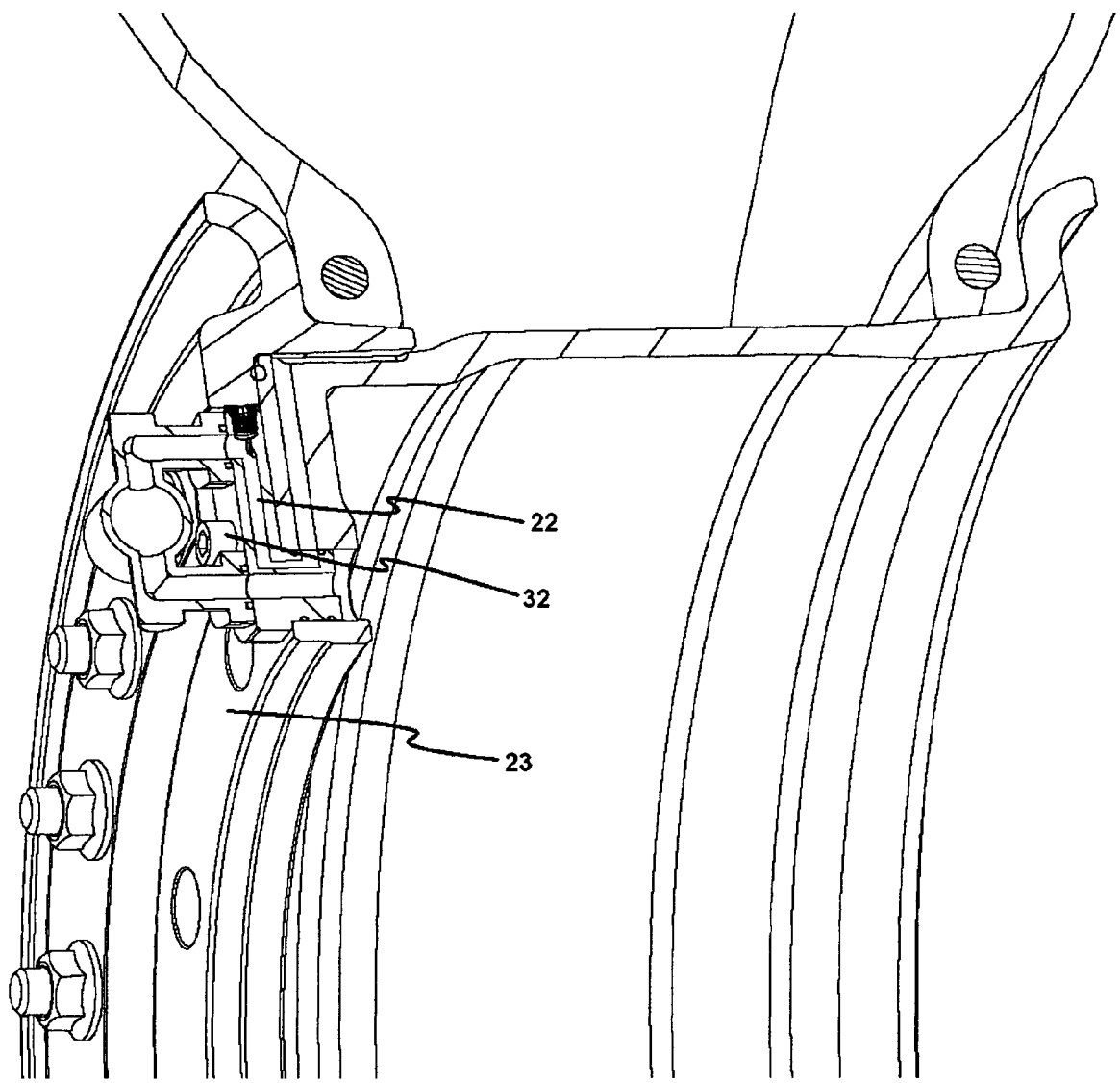
FIG. 4 provides a more detailed perspective view of the configuration illustrated in FIG. 3.

The inventive concept can be actualized in various ways, with illustrative examples being provided in the drawing figures described below. Thus, as a first example, FIGS. 3 and 4 show a general configuration of a manifold 22 on the wheel face 23 with a "hub-side" port 24, internal airways to the valve "hub-side" port 25, the valve 2, internal airways from the valve "tire-side" port 26, and a manifold "tire-side" port 27. A boss 28 protruding from the manifold body 29 pilots into the wheel face 23 (this boss 28 may protrude partially into or completely through the wheel face 23). A sealing methodology is used to ensure no air leakage from any of the manifold or valve hub and tire ports. In this figure, two radial o-rings 30 are shown to seal the manifold tire-side port 27. The manifold hub-side port 25 is sealed using a hub o-ring 31. The manifold tire side port 27 and hub-side port 24 can be sealed by other means including, but not limited to, gaskets, sealed threads, press fits, etc. As most clearly shown in FIG. 4, the manifold 22 can be advantageously secured to the wheel by use of threaded fasteners 32. However, manifold 22 can also be secured to wheel face 23 by means including, but not limited to, threaded fasteners, snap fits, a threaded body, etc.

In terms of operation, air passes from the hub into a "hub side" airway of the wheel and/or the CTI manifold assembly (which consists of a CTI valve fixed to the manifold). The manifold channels the air to the CTI valve. The air passes through the CTI valve and back into a second, separate airway in the manifold. The manifold interfaces with a secondary "tire side" port and airway in the wheel, which then channels the air to the tire cavity. It is obvious that this manifold also allows for the CTI valve to deflate the tire, which is a typical function for central tire inflation systems. It is also a simple matter to change the manifold to accommodate CTI valves with various porting and/or mounting configurations to a wheel with fixed porting.

Figure 5:
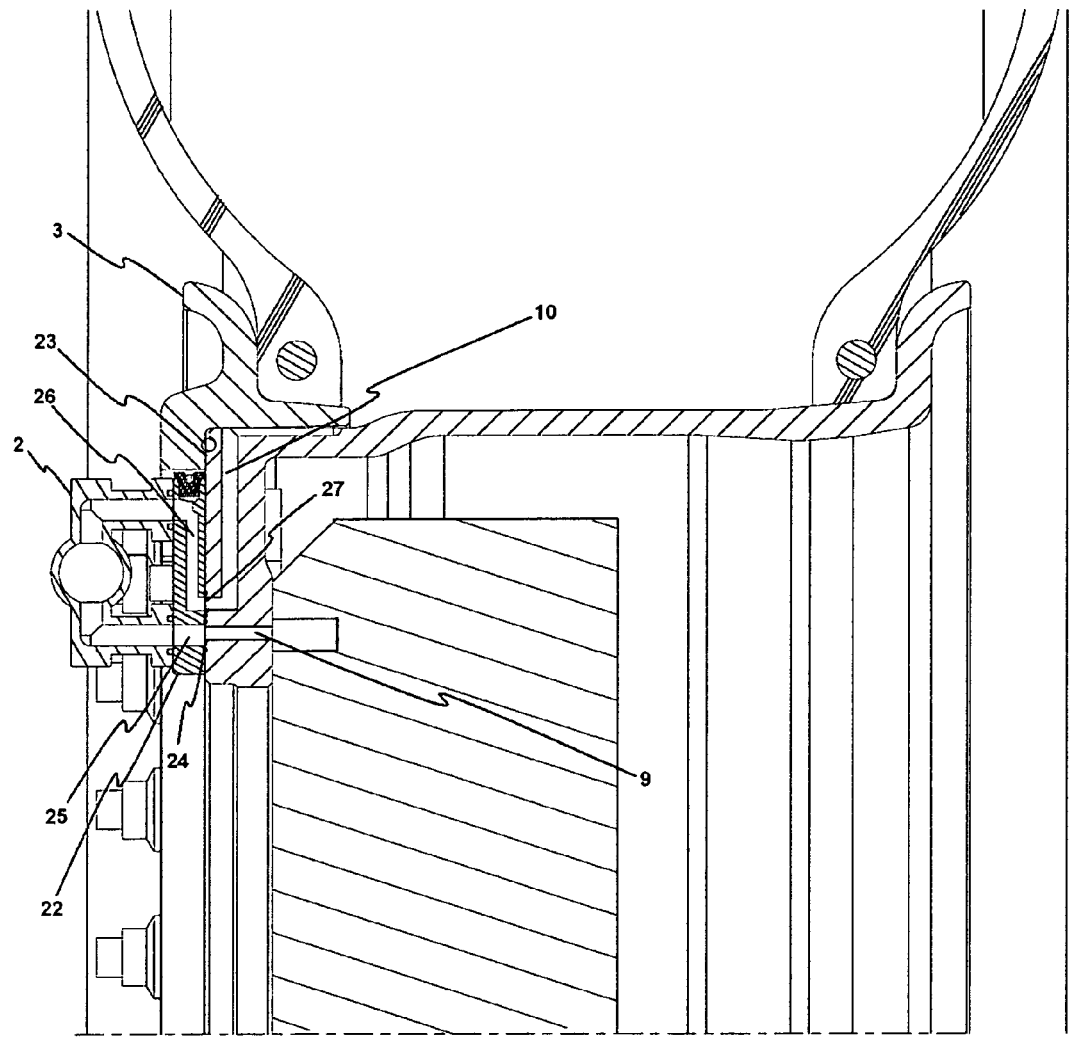
FIG. 5 provides a cross-sectional view of a portion of a two-piece wheel showing a second preferred exemplary configuration for a manifold and a manifold, wheel, CTI Valve combination.

Another possible configuration is illustrated in FIG. 5, which shows an alternative interface between the manifold airways 25 and 26 and the wheel airways 9 and 10. In this case there is no pilot into the wheel face 23, and the manifold 22 is seated entirely on the wheel face 23. A "hub-side" airway 9 from the wheel 3 mates with a "hub-side" port 24 on the manifold 22. A "tire-side" port 27 on the manifold 22 mates with a "tire-side" airway 10 on the wheel face 23. Sealing between the mating ports can be achieved by means including, but not limited to, o-rings, gaskets, sealed threads, etc.

Figure 6:
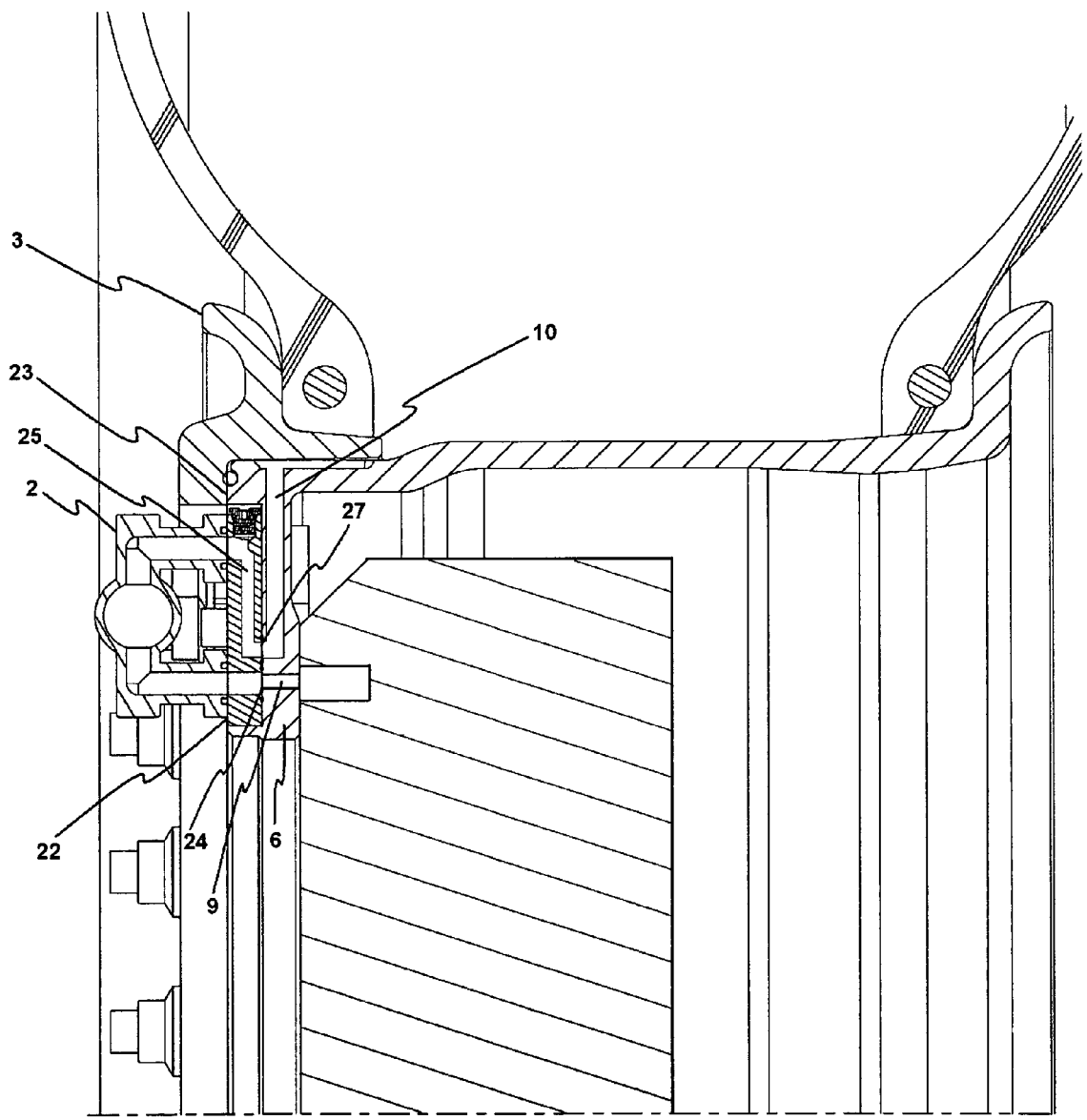
FIG. 6 provides a cross-sectional view of a portion of a two-piece wheel showing a third preferred exemplary configuration for a manifold and a manifold, wheel, CTI Valve combination.

FIG. 6 shows still another alternative interface between the manifold 22 and the wheel 3. In this case the manifold itself 22 is secured entirely within the wheel disc 6. A "hub-side" airway 9 from the wheel 3 mates with a "hub-side" port 24 on the manifold 22. A "tire-side" port 27 on the manifold 22 mates with a "tire-side" airway 10 on the wheel face 23. Sealing between the mating ports can be achieved by means including, but not limited to, o-rings, gaskets, sealed threads, etc.

Figure 7:
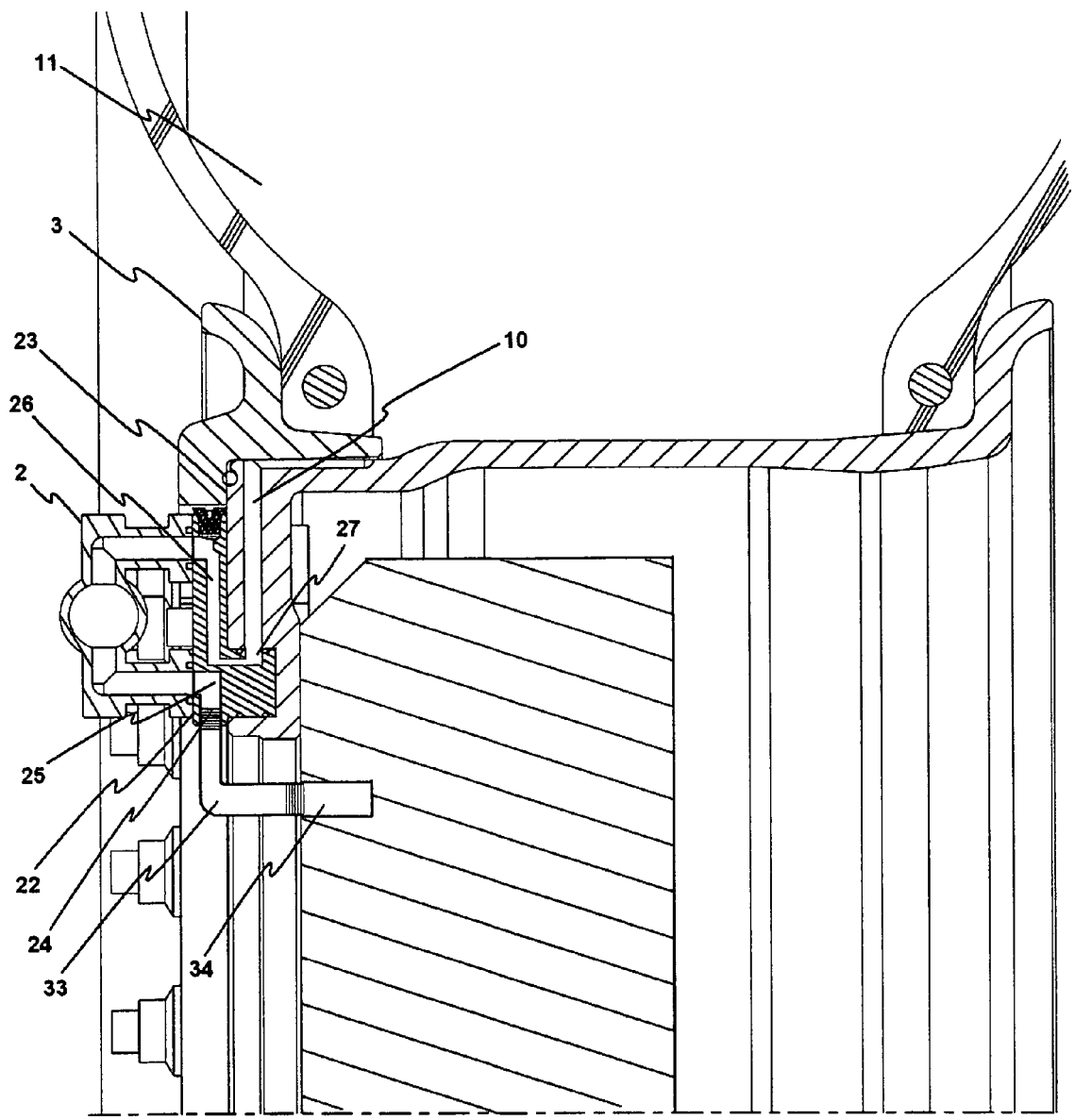
FIG. 7 provides a cross-sectional view of a portion of a two-piece wheel showing a fourth preferred exemplary configuration for a manifold and a manifold, wheel, CTI Valve combination.

Finally, FIG. 7 shows an alternative interface in which an external connection, in this case a hose or tube 33, is used to connect the air source on the hub 34 to the CTI manifold "hub-side" port 25. The manifold 22 then channels the air to the CTI valve 2 and to the tire chamber 11 as described in Section 6. It is obvious that an external connection can be used for either or both the "hub-side" and/or "tire-side" ports on the manifold.

Further, though the configurations shown herein have displayed the manifold attached to the wheel face, it is obvious that this manifold can be affixed to the wheel in any number of places including, but not limited to, the backside of the wheel face, wheel spokes, the rim portion, etc. Moreover, though the configurations shown herein have been demonstrated using a two-piece, bolt together wheel, it is an obvious extension of this concept to apply it to one-piece and three piece wheels as well. From the foregoing, it will be appreciated that numerous variations are possible without exceeding the scope of the inventive concept set forth herein. For example, various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the claims that follow.

PARTS LIST 1 2 Piece Wheel Assembly
2 CTI Valve
3 2 Piece Wheel
4 Tire
5 Rim Portion of wheel
6 Disc Portion of wheel
7 Rim Flat Area
8 Hub Bore Area
9 CTI Airway (Hub)
10 CTI Airway (Tire)
11 Tire Chamber
12 Outer Rim Half
13 Inner Rim Half
14 O-Ring
15 Stud
16 Nut
17 External CTI Valve
18 Quick Release Valve
19 Hub Side Hose/Tube
20 Tire Side Hose/Tube
21 Air Fitting
22 Manifold
23 Wheel Face
24 Hub Side Port (Manifold)
25 Airway from "Hub Side" Port
26 Airway from "Tire Side" Port
27 Tire Side Port (Manifold)
28 Manifold Boss
29 Manifold Body
30 Radial O-Rings (Manifold)
31 Hub O-Ring
32 Threaded Fastener
33 CTI Hose or Tube
34 Air Port on Hub

What is claimed is:

1. A system, comprising:
    a circular wheel rim having a central rotational axis and having formed coaxially on opposite ends thereof outwardly flaring circumferential flange sections disposed to be engaged by the beads of a tire mounted on the rim;
    said wheel rim having intermediate said opposite ends thereof, a transverse wall section extending transversely of the axis of said rim, said transverse wall section being adapted to connect to a vehicle wheel hub having a hub port for the passage of air;
    a central tire inflation valve manifold mounted to said transverse wall section, wherein said manifold includes:
        a tire-side manifold air passageway; and
        a hub-side manifold air passageway; and
    a central tire inflation valve mounted to an exterior surface of said manifold, wherein said valve includes:
        a tire-side valve air passageway, said tire-side valve air passageway being in communication with said tire-side manifold air passageway; and
        a hub-side valve air passageway, said hub-side valve air passageway being in communication with said hub-side manifold air passageway, wherein said valve is in communication with:

said hub port via said hub-side manifold air passageway if said transverse wall section is connected to said vehicle wheel hub; and
an interior of said tire via said tire-side manifold air passageway if said tire is mounted on said rim;
wherein at least one of the following:
both a first end and a second end of the tire-side valve air passageway are axially offset from:
a first end of a first air duct formed within the wheel rim; and
a second end of the first air duct, wherein the second end of the first air duct is open at an outer periphery of the wheel rim; and
both a first end and a second end of the hub-side valve air passageway are axially offset from:
a first end of a second air duct formed within the transverse wall section; and
a second end of the second air duct.

2. The system described in claim 1, wherein said first air duct is in communication at the second end with said tire-side manifold air passageway, wherein said valve is in communication with said tire interior via said first air duct and said tire-side manifold air passageway if said tire is mounted on said rim.

3. The system described in claim 1, wherein a portion of said manifold is inset into a cavity formed in said transverse wall section.

4. The system described in claim 3, wherein the portion of said manifold inset into said cavity forms a boss extending into said transverse wall section, said boss includes a portion of said hub-side manifold air passageway, and wherein said hub-side manifold air passageway is in communication with said hub port via said boss if said transverse wall section is connected to said vehicle wheel hub.

5. The system described in claim 1, wherein said hub-side manifold air passageway is in communication with said hub port via said second air duct if said transverse wall section is connected to said vehicle wheel hub.

6. The system described in claim 1, further comprising an external air duct in communication with said hub-side manifold air passageway, wherein said valve is in communication with said hub port via said external air duct and said hub-side manifold air passageway if said transverse wall section is connected to said vehicle wheel hub.

7. The system described in claim 1, wherein a sealed air passageway is created between said hub port and said valve if the transverse wall section is mounted to the hub.

8. The system described in claim 1, wherein said manifold is removably mounted to at least one of the following:
said transverse wall section, and
the central tire inflation valve.

9. A system, comprising:
a circular wheel rim having a central rotational axis and having formed coaxially on opposite ends thereof outwardly flaring circumferential flange sections disposed to be engaged by the beads of a tire mounted on the rim;
said wheel rim having intermediate said opposite ends thereof, a transverse wall section extending transversely of the axis of said rim, said transverse wall section being adapted to connect to a vehicle wheel hub having a hub port for the passage of air;
a central tire inflation valve manifold mounted to said transverse wall section, wherein said manifold includes:
a tire-side manifold air passageway; and
a hub-side manifold air passageway;
a central tire inflation valve mounted to an exterior surface of said manifold, wherein said valve includes:
a tire-side valve air passageway, said tire-side valve air passageway being in communication with said tire-side manifold air passageway; and
a hub-side valve air passageway, said hub-side valve air passageway being in communication with said hub-side manifold air passageway, wherein at least one of the following:
both a first end and a second end of the tire-side valve air passageway are axially offset from:
a first end of a first air duct formed within the wheel rim; and
a second end of the first air duct, wherein the second end of the first air duct is open at an outer periphery of the wheel rim; and
both a first end and a second end of the hub-side valve air passageway are axially offset from:
a first end of a second air duct formed within the transverse wall section; and
a second end of the second air duct; and
wherein said valve is in communication with:
said hub port via said hub-side manifold air passageway if said transverse wall section is connected to said vehicle wheel hub; and
an interior of said tire via said first air duct and said tire-side manifold air passageway if said tire is mounted on said rim; and
wherein said manifold is removably mounted to at least one of the following:
said transverse wall section, and
the central tire inflation valve.

10. The system described in claim 9, wherein a portion of said manifold is inset into a cavity formed in said transverse wall section.

11. The system described in claim 10, wherein the portion of said manifold inset into said cavity forms a boss extending into said transverse wall section, said boss includes a portion of said hub-side manifold air passageway, and wherein said hub-side manifold air passageway is in communication with said hub port via said boss if said transverse wall section is connected to said vehicle wheel hub.

12. The system described in claim 9, wherein said hub-side manifold air passageway is in communication with said hub port via said second air duct if said transverse wall section is connected to said vehicle wheel hub.

13. The system described in claim 9, further comprising an external air duct in communication with said hub-side manifold air passageway, wherein said valve is in communication with said hub port via said external air duct and said hub-side manifold air passageway if said transverse wall section is connected to said vehicle wheel hub.

14. The system described in claim 9, wherein a sealed air passageway is created between said hub port and said valve if the transverse wall section is mounted to the hub.

15. A system, comprising:
a circular wheel rim having a central rotational axis and having formed coaxially on opposite ends thereof outwardly flaring circumferential flange sections disposed to be engaged by the beads of a tire mounted on the rim;
said wheel rim having intermediate said opposite ends thereof, a transverse wall section extending transversely of the axis of said rim, said transverse wall section being adapted to connect to a vehicle wheel hub having a hub port for the passage of air;
a central tire inflation valve manifold mounted to said transverse wall section, wherein said manifold includes:
a tire-side manifold air passageway; and a hub-side manifold air passageway in communication with said hub port;
a central tire inflation valve mounted to an exterior surface of said manifold, wherein said valve includes:
a tire-side valve air passageway, said tire-side valve air passageway being in communication with said tire-side manifold air passageway; and
a hub-side valve air passageway, said hub-side valve air passageway being in communication with said hub-side manifold air passageway, wherein at least one of the following:
both a first end and a second end of the tire-side valve air passageway are axially offset from:
a first end of a first air duct formed within the wheel rim; and
a second end of the first air duct, wherein the second end of the first air duct is open at an outer periphery of the wheel rim; and
both a first end and a second end of the hub-side valve air passageway are axially offset from:
a first end of a second air duct formed within the transverse wall section; and
a second end of the second air duct; and
wherein said valve is in communication with:
said hub port via said hub-side manifold air passageway if said transverse wall section is connected to said vehicle wheel hub; and
an interior of said tire via said first air duct and said tire-side manifold air passageway if said tire is mounted on said rim;
wherein said manifold is removably mounted to at least one of the following:
said transverse wall section, and
the central tire inflation valve; and
wherein a sealed air passageway is created between said hub port and said valve if the transverse wall section is mounted to the hub.

16. The system described in claim 15, wherein at least a portion of said manifold is inset into a cavity formed in said transverse wall section.

17. The system described in claim 16, wherein the portion of said manifold inset into said cavity forms a boss extending into said transverse wall section, said boss includes a portion of said hub-side manifold air passageway, and wherein said hub-side manifold air passageway is in communication with said hub port via said boss if said transverse wall section is connected to said vehicle wheel hub.

18. The system described in claim 15, wherein said hub-side manifold air passageway is in communication with said hub port via said second air duct if said transverse wall section is connected to said vehicle wheel hub.

19. The system described in claim 15, further comprising an external air duct in communication with said hub-side manifold air passageway, wherein said valve is in communication with said hub port via said external air duct and said hub-side manifold air passageway if said transverse wall section is connected to said vehicle wheel hub.

20. A system, comprising:
a wheel, wherein the wheel defines first and second air passageways;
an adapter member connected to the wheel, wherein the adapter member defines third and fourth air passageways, and wherein:
a first opening of the first air passageway is axially aligned with a first opening of the third air passageway;
a first opening of the second air passageway is axially aligned with a first opening of the fourth air passageway; and at least one of the following:
the first opening of the third air passageway is axially offset from a second opening of the third air passageway; and
the first opening of the fourth air passageway is axially offset from a second opening of the fourth air passageway; and
a central tire inflation valve assembly mounted to an exterior surface of the adapter member, wherein the central tire inflation valve assembly defines fifth and sixth air passageways, and wherein:
a second opening of the third air passageway is axially aligned with a first opening of the fifth air passageway; and
a second opening of the fourth air passageway is axially aligned with a first opening of the sixth air passageway;
wherein the central tire inflation valve assembly is in communication with:
a hub port of a vehicle wheel hub if the wheel is connected to the vehicle wheel hub; and
an interior of a tire if the tire is mounted on the wheel.

* * * * *